Aug. 5, 1958 W. A. FARRAND ET AL 2,846,517

MAGNETIC HEAD

Filed March 1, 1954

*INVENTORS.*
WILLIAM A. FARRAND
LESTER L. KILPATRICK
BY SPENCER G. JOHNSTON
William R. Lane
ATTORNEY United States Patent Office 2,846,517

Patented Aug. 5, 1958

2,846,517

MAGNETIC HEAD

William A. Farrand and Lester L. Kilpatrick, Downey, and Spencer G. Johnston, Los Angeles, Calif., assignors to North American Aviation, Inc.

Application March 1, 1954, Serial No. 413,394

7 Claims. (Cl. 179—100.2)

This invention is a magnetic head for recording and reproducing electrical signals in cooperation with a traveling magnetic medium. Several types of magnetic heads are constructed in a manner which produces leakage flux near the air gap of the head to impress a magnetic pole upon the adjacent magnetic medium. A type of head which does this is known as a ring recorder. Heads using this principle of recording are difficult to isolate and shield.

The head of this invention produces magnetic poles within the magnetic medium by actual direction of the flux path through the magnetic medium rather than by leakage flux being directed into the medium. Among the advantages obtained by such a scheme are wide frequency response (10 cycles to 10 megacycles), improved signal-to-noise ratio in recording and reading, and isolation between channels. A typical recording device in which this head could be utilized is described in Patent 2,750,570, entitled Magnetic Disc Data Storage Device, issued June 12, 1956, to J. P. Lekas et al. and assigned to North American Aviation, Inc., assignee of the present invention.

In order to keep the channel width in a recorder to a minimum, the magnetic head must also be diminutive in proportion. The particular construction used by applicants render this head relatively easy to construct in small sizes. Further, it is possible to encase the entire head in a shield with the exception of the recording gap.

It is therefore an object of this invention to provide an improved magnetic transducer.

It is another object of this invention to provide an improved magnetic recording head which directs the flux into the magnetic medium.

It is a further object of this invention to provide a relatively easily constructed magnetic head.

A still further object of the invention is to provide an effectively shielded magnetic head.

Other objects of invention will become apparent from the following description taken in connection with the accompanying drawings, in which.

Figure 1:
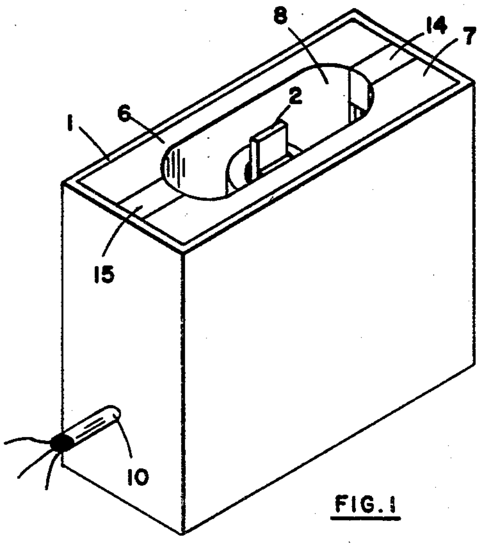
Fig. 1 is a perspective view of the head as constructed for recording.
Figure 2:
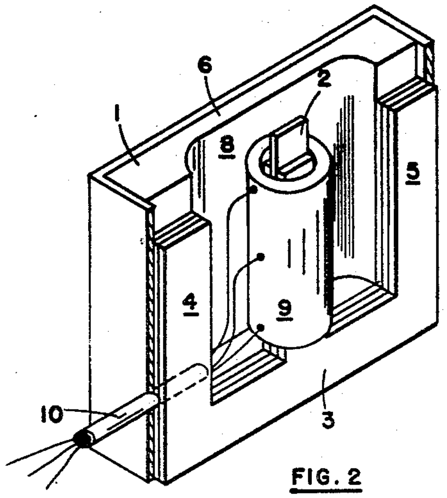
Fig. 2 is a partial cross section of Fig. 1.

Referring now to Fig. 1, the entire head is encased in three successively electroplated layers 1 of nickel and copper to prevent radiation. The head is constructed of a pole piece 2, the end of which is visible in Fig. 1. Fig. 2 shows that the high permeability core 3 has, in addition to pole piece 2, pole pieces 4 and 5. This core is constructed of three laminations each 0.001 inch thick of iron and nickel alloy, or iron, nickel, and cobalt alloy such as Supermalloy. Pole pieces 4 and 5 which are disposed oppositely to each other are held between two sections 6 and 7 of a ferrite and ceramic material called "Ferramic." The ferrite provides high permeability and the ceramic accounts for low loss because of its high bulk resistivity. Any material having these characteristics would be satisfactory. A central recess 8 is formed between Ferramic sections 6 and 7. Pole piece 2 extends through this recess. In the center recess 8 is a plastic such as an epoxy resin mixed with a filler such as glass beads. This material matches its expansion to the expansion of the surrounding materials when heat is applied.

In Fig. 2, coil 9, a thousand turns of No. 46 wire, is wound around pole piece 2. A lead is provided at each end and at the center. A shield 10 is provided for the connections to coil 9. It is noted in Figs. 1 and 2 that the center lamination of pole piece 2 extends above coil 9 to a surface coplanar with the surface of sections 6 and 7, while the remaining two laminations terminate approximately flush with the uppermost end of coil 9. It is also noted that pole pieces 4 and 5 terminate below the face of sections 6 and 7. In this manner, the magnetic path is directed from pole piece 2 into the magnetic medium which is passing over the face of sections 6 and 7. The return magnetic path is the whole face of sections 6 and 7. Thus, the return flux is not concentrated in the area of the pole pieces 4 and 5 but is distributed over the entire pole face area formed by sections 6 and 7. This latter pole face area is substantially greater than the pole face area of pole piece 2; therefore, saturation flux density can exist at the center pole face with very low flux density in the encompassing pole face.

Figure 3:
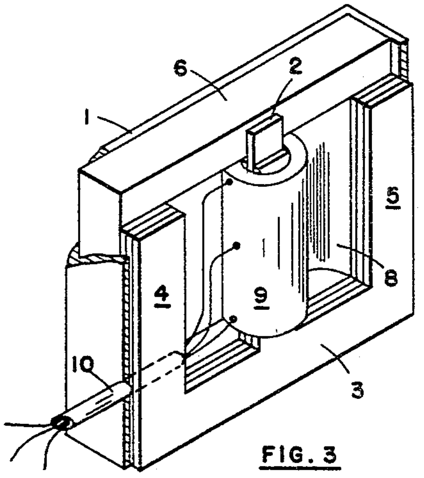
Fig. 3 is a partial cross section of the head as constructed for reading.

Fig. 3 is a modified version of the head adapting it for reading. The core 3 is reversed with respect to the sections 6 and 7, the opening into recess 8 lying at the base instead of at the face of the head. In this modification, the spacing between the ferrite material and the center lamination of pole piece 2 is about 0.002 of an inch. If a center core of five laminations is used, the two laminations on each side of the center lamination provide correct spacing of the ferrite. Otherwise, it is obtained by a non-magnetic shim or dielectric between the lamination and the Ferramic section. This same dielectric may be used as a filler between sections 6 and 7 in gaps 14 and 15, which are enlarged for clarity in Fig. 1.

Figure 4:
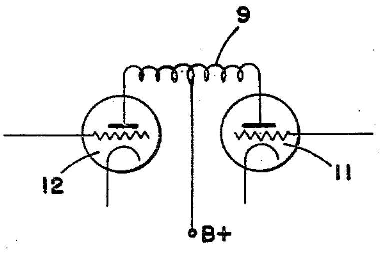
Fig. 4 is a schematic of the electrical connections using the head to record.

Fig. 4 indicates how the three connections to this head would be utilized in recording, the center tap being connected to the B+ supply and each end of the coil 9 being connected to the plate of driver tubes 11 and 12. A phantom center tap can be substituted for an actual center tap.

Figure 5:
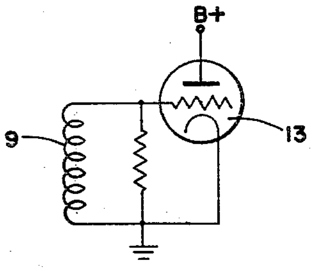
Fig. 5 is a schematic of the connections using the head to read.

Fig. 5 indicates how the head is utilized as a reading head. The center tap is not used and one end of the coil is connected to ground; the other end is connected to the grid of a detector 13.

Figure 6:
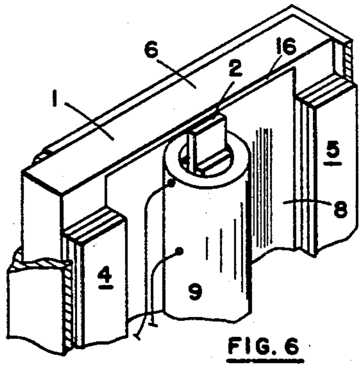
Fig. 6 is a head modified for high frequencies.

Fig. 6 is a modified version in which the width 16 of the sections 6 and 7 at the face is reduced to about 0.010 of an inch. This reduces the flux leakage between the sections and the pole piece, and allows the reading at higher frequencies. However, reduced width requires increased structural strength in the sections 6 and 7 which then should be made of a metal having low eddy current loss, such as sintered high permeability alloys.

Practical dimensions for the construction of this head are: width 0.45 inch by 0.2 inch, depth 0.5 inch, pole width (a single lamination at the face of the head) 0.001 inch by 0.065 inch.

A desirable feature obtained herein is the encasement of the entire head with the exception of the recording gap. Additionally, the magnetic coil is encompassed by a magnetic material which prevents radiation and further increases the isolation between recording channels and heads, due to a minimum of leakage flux and end effects.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a magnetic head having a central pole face and an encompassing pole face, a core including at least two pole members, a coil disposed on said core, a high permeability, low loss material continguous with one of said pole members and encompassing in fixed spaced relationship the other of said pole members, said latter pole member forming said central pole face, said encompassing material forming said encompassing pole face, said pole faces being substantially coplanar and the area of the encompassing pole face being substantially greater than the area of said central pole face.

2. A magnetic head comprising a central pole face and an encompassing pole face, said pole faces being substantially coplanar, a core having a coil disposed thereon and including a first pole member terminating below the plane of said pole faces, said core including a second pole member terminating in the plane of said pole faces and forming said central pole face, and a high initial permeability, low loss material continguous with said first pole member and encompassing in spaced relationship said second pole member thereby forming said encompassing pole face.

3. A magnetic head comprising a core, a coil disposed upon said core, a high permeability, high resistivity material containing ferrite forming a substantial portion of the face of said head and lying contiguous with one pole of said core and encompassing said coil and encompassing in fixed space relationship the other pole of said core, said material and said other pole terminating in a common plane, and successive electroplated layers of nickel and copper providing a shield enclosing said head except on the common plane of said ferrite and said pole whereby said head is electromagnetically isolated.

4. A magnetic head comprising a laminated E-shaped, high permeability core, the center pole of said E-shaped core extending beyond the outer poles thereby forming a central pole face, a coil disposed upon the central pole of said core, a high permeability, low loss magnetic material surrounding said central pole and contiguous with the outer poles of said core thereby forming an encompassing pole face, the face of said magnetic material being substantially coplanar with the central pole face to form the return magnetic path.

5. A magnetic head comprising a laminated, E-shaped, high permeability core, a coil disposed upon the central pole of said core, a ferrite material surrounding said central pole and contiguous with the outer poles of said core, said ferrite material forming a face coplanar with the face of the central pole of said core, said outer poles terminating short of the face of said ferrite material, dielectric means disposed between said ferrite material and said central pole.

6. A magnetic head comprising a laminated E-shaped, high permeability core, the central pole of said E-shaped core extending beyond the outer poles, a coil disposed upon the central pole of said core, at least one of the central laminations of said core extending beyond the extremity of said coil and the remaining laminations terminating at the edge of said coil, high permeability ferrite surrounding said central pole and contiguous with the outer poles of said core, and a dielectric disposed between said ferrite and said central pole.

7. The combination recited in claim 2 wherein said encompassing pole face has a substantially greater area than said central pole face.

References Cited in the file of this patent

UNITED STATES PATENTS

| | | |
|---|---|---|
| 2,536,272 | Friend | Jan. 2, 1951 |
| 2,686,846 | Bauman et al. | Aug. 17, 1954 |
| 2,692,978 | Galt | Oct. 26, 1954 |
| 2,761,016 | Muller | Aug. 28, 1956 |

FOREIGN PATENTS

| | | |
|---|---|---|
| 512,766 | Great Britain | Nov. 30, 1937 |